Patented June 14, 1949

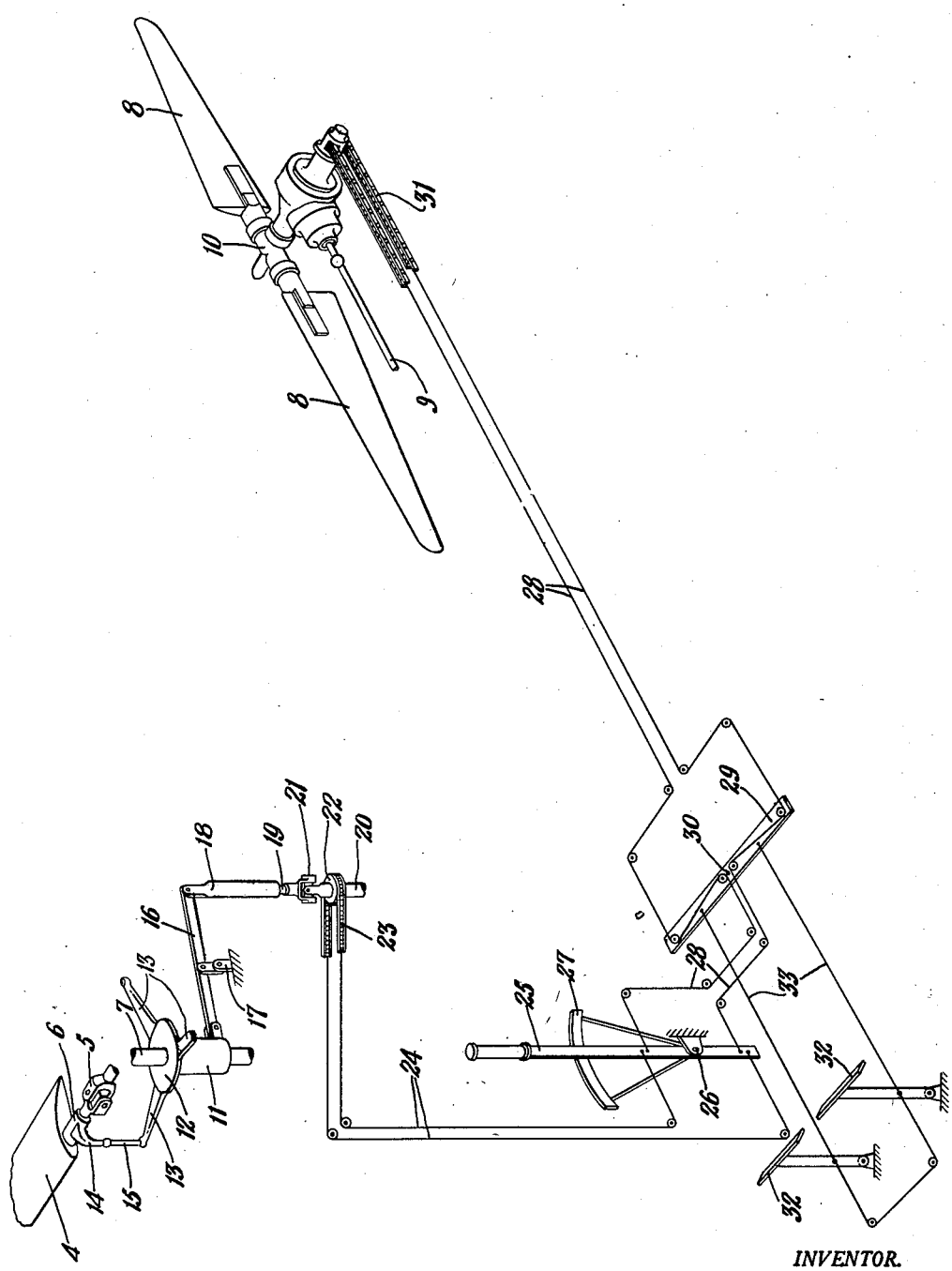

2,473,299

UNITED STATES PATENT OFFICE 2,473,299

ROTATIVE WINGED AIRCRAFT CONTROL

Harold F. Pitcairn, Bryn Athyn, Pa., assignor to Autogiro Company of America, Philadelphia, Pa., a corporation of Delaware Application May 15, 1944, Serial No. 535,632

1 Claim. (Cl. 170—135.24)

This invention relates to rotative winged aircraft, and particularly to control systems for such aircraft.

The invention is especially adapted to rotative winged aircraft of the type having a sustaining rotor adapted to be driven through the hub, and having an anti-torque rotor or airscrew positioned so as to counteract the rotor driving torque. In aircraft of this type the anti-torque airscrew may be located at the tail of the machine or laterally toward one side as in Bennett Patent No. 2,317,340, issued April 27, 1943. In either arrangement, the airscrew is adjustable to vary the thrust thereof, whereby said airscrew may be employed not only to counteract the rotor driving torque but also as a means for controlling the aircraft in yaw.

According to the invention it is contemplated that the blade pitch angle of the sustaining rotor be controllable so as to vary the lift of the rotor. In various kinds of flight, adjustment of the rotor blade pitch angle results in appreciable variation in the rotor drive torque reaction. Thus, a substantial increase in rotor blade pitch angle results in a substantial increase in torque reaction, and vice versa. This occurs in high speed translational flight but is most pronounced when hovering or at low speed translation.

With the foregoing in mind the present invention provides a control system including means for varying the blade pitch angle of the sustaining rotor, the control system further including mechanism automatically operated upon adjustment of the rotor blade pitch angle to vary the torque counteractive effect of the anti-torque airscrew in a sense compensating for the increase or decrease of torque reaction incident to increase or decrease of rotor blade pitch.

The control system of the present invention further provides a pilot operated control coupled with the anti-torque airscrew to vary the thrust thereof, which pilot operated control serves to control the aircraft in yaw. In the preferred construction the action of the control last mentioned is superimposed upon the condition established as a result of adjustment of the pitch angle of the sustaining rotor. In this way the range of adjustment of the yaw control is always available for normal flight maneuvering.

In the preferred embodiment variation of the thrust of the anti-torque airscrew is effected by varying the pitch of the airscrew blades, this variation in airscrew pitch being employed not only for control in yaw but also to compensate for variation in torque reaction set up as a result of change of blade pitch of the sustaining rotor. With a variable pitch anti-torque airscrew, increase of the pitch angle of the sustaining rotor is automatically accompanied by increase in pitch of the airscrew, and vice versa.

According to another feature of the invention, provision is made for adjustment of the rotor blade pitch angle over a range including a value appropriate for effecting vertical ascent and also a value appropriate for autorotational actuation of the rotor, for example in the event of engine failure. It is contemplated that adjustment of the pitch angle of the sustaining rotor from a high vertical lift pitch angle to a lower autorotational pitch angle shall be accompanied by a reduction in pitch angle of the anti-torque airscrew approximately to that angle giving zero thrust, since in the event of engine failure and continued operation of the sustaining rotor by autorotation, no torque reaction is present and no torque counteractive effect is at that time desired from the airscrew. Moreover, in the preferred embodiment drive of the airscrew is continued through a transmission coupling it with the rotor, and the airscrew pitch is controllable toward either side of the zero effective pitch value under the influence of the pilot operated yaw control. Thus, effective control in yaw is retained notwithstanding engine failure.

How the foregoing and other objects and advantages are obtained will appear more fully from the following description referring to the accompanying drawing in which the single figure is a schematic view illustrating a control system according to the present invention associated with a sustaining rotor and with an anti-torque airscrew.

Referring to the drawing, a sustaining rotor blade is indicated at 4, it being mentioned that the sustaining rotor may incorporate any desired number of blades, each of which is preferably pivotally connected with a rotative hub or shaft. In the form illustrated each blade is mounted by means of pivots providing a universal joint 5 affording freedom for blade swinging movement at least in a plane generally transverse the mean rotative path of travel and preferably also in the lag-lead sense. A pitch change pivot 6 provides for movement of the blade about its own longitudinal axis.

The pivots above described serve to connect the blade with a rotor drive shaft, such as shown at 7, in a manner well understood in this art. The lower end of shaft 7 is adapted to be extended downwardly into the body of the aircraft (not shown) for connection with an engine, preferably through a transmission incorporating appropriate gearing and a manually disconnectible clutch. The transmission also desirably includes an overrunning clutch, so as to insure freedom for autorotation of the rotor in the event of engine failure.

The anti-torque airscrew, the blades of which are indicated at 8—8, may be laterally offset as disclosed in the above mentioned Bennett patent, but in the drawing it is assumed that the airscrew is located at the tail of the machine in position to rotate about a transversely extending horizontal axis. This airscrew is provided with a drive transmission including a shaft 9 adapted to be coupled to the engine in the body of the aircraft. In the preferred embodiment the airscrew drive shaft 9 and the sustaining rotor drive shaft 7 are interconnected, and the overrunning clutch of the rotor drive transmission is located at a point in the transmission which will not influence the continued rotation of the airscrew under the influence of aerodynamic rotation of the sustaining rotor.

The blades 8—8 of the airscrew are mounted at their root ends in a hub member 10 by means of bearings providing freedom for pitch change movement of the blades. If desired the blades 8 may also be connected with the hub through other pivots, for instance, of the type indicated for the rotor at 5.

From the foregoing it will be seen that both the sustaining rotor and the anti-torque airscrew are provided with means for variation of the blade pitch angle. In the case of the sustaining rotor provision may be made for periodic differential change of blade pitch for purposes of controlling the aircraft in pitch and roll, but mechanism for effecting this particular type of pitch control need not be considered in detail herein as it forms no part of the present invention per se.

The mean rotor blade pitch angle is adapted to be adjusted by a non-rotative vertically sliding sleeve 11 mounted on the drive shaft 7. Disc 12 is rotatively mounted on sleeve 11 and is adapted to be vertically moved upon vertical movement of the sleeve. The pitch control connections to each blade include an arm 13 carried by disc 12, an arm 14 connected with the blade and a universally jointed link 15 interconnecting arms 13 and 14. As will readily be seen, raising sleeve 11 effects increase of blade pitch, while lowering the sleeve decreases the blade pitch. The arm 14 is desirably extended so that the universal joint at the connection between this arm and the link 15 lies on or close to the pivot axis of the blade mounting joint 5 on which the blade may swing upwardly and downwardly. Because of this arrangement, the pitch of the blade is not extensively altered upon blade swinging.

The vertical movement of sleeve 11 may be effected by means of a lever 16 which is pivotally mounted intermediate its ends, as by a support 17. One end of lever 16 is pivoted to the sleeve and the other end is pivoted to a link 18, the lower end of which is internally threaded to receive the screw thread member 19 which latter is coupled with rotatively mounted shaft 20 through universal joint 21. Shaft 20 carries a sprocket 22 adapted to be actuated by chain length 23, the ends of the chain being associated with cable system 24—24. Cables 24 are extended over appropriate pulleys and are fastened to the pitch control lever 25 at points above and below the lever pivot 26. Actuation of lever 25 over the quadrant 27 effects rotation of sprocket 22 and screw 19, and this in turn raises and lowers link 18 and thus increases or decreases the blade pitch. It will be understood that sprocket shaft 20 is appropriately journalled in a manner providing against vertical movement thereof.

The pitch angle of the anti-torque airscrew is also adjusted upon movement of control lever 25. The control system provided for this purpose includes cable system 28—28. Cables 28 extend over pulleys mounted on the bar 29, which bar is centrally pivoted as at 30, the cables being extended beyond the bar for attachment to the free ends of the length 31 of chain which is associated with a sprocket forming a part of the pitch control mechanism mounted in common with the airscrew hub and drive.

The bar 29 adapted to be adjustably swung about its pivot support 30 by means of a pair of foot pedals 32—32 with which cable system 33 is associated, the ends of these cables being connected with the bar 29 as clearly appears.

Springs or other slack take-up devices may be inserted in any of the cable systems.

Examination of the drawing shows that with the pitch control lever 25 in a given position, actuation of the foot pedals 32—32 will cause the bar 29 to swing and this in turn will actuate the rear portions of cables 28 to adjust the blade pitch of the airscrew. Moreover, with any adjustment of the foot pedals 32, the pitch of the airscrew (and also of the sustaining rotor) may be adjusted by moving the hand lever 25. Thus, with respect to airscrew pitch change, the effects of actuation of the foot pedals and of the lever 25 are superimposed upon each other.

The operation of the foregoing control system is as follows:

Assuming first that the aircraft is in hovering flight and that it is desired to ascend vertically; for this purpose it may be desired to increase the rotor blade pitch angle and this is accomplished by appropriate adjustment of lever 25. Increase of the rotor blade pitch angle also increases the torque reaction of the rotor and this is compensated for (or approximately so) by the increase of pitch angle of the anti-torque airscrew brought about through actuation of cable system 28. Similarly, if the rotor blade pitch angle is decreased, for example for the purpose of descending vertically, the pitch angle of the airscrew is also decreased, thereby compensating for the reduction in rotor driving torque.

It will be understood that the automatic variation of torque counteractive effect of the airscrew when the rotor blade pitch is adjusted will not always exactly correspond with the variation in rotor driving torque arising from change of rotor blade pitch. Minor inaccuracies in compensation may readily be taken care of by actuation of the foot pedals 32.

The foregoing system of control is not only of advantage in providing the automatic compensation of torque counteractive force of the anti-torque airscrew, but it is further of advantage since substantially the full throw of the foot pedals always remains available for purposes of control in yaw or steering.

Another advantageous characteristic of the operation results from the contemplated proportioning of the controls so as to reduce the mean effective pitch of the anti-torque airscrew to zero in the event of adjustment of the hand lever sufficiently to bring the rotor blade pitch angle to an autorotational value appropriate for vertical descent in the event of engine failure or in the event of descent without power by retarding the engine throttle. In this way, even in the event of engine failure, the full throw of the foot pedals 32 is available for directional control. It is mentioned again that at this time (in the event of engine failure) the anti-torque rotor is driven by the autorotation of the sustaining rotor.

It may be mentioned that while positively acting releasable latches or the like may be associated with the foot pedals 32 or equivalent, these may not always be required, particularly since the cable systems are so arranged that operation of the conjoint control for both the rotor and the airscrew will have little tendency to move the foot control, since the aerodynamic control loads are small. A relatively light frictional restraint, for example at the mounting pivot, is sufficient to prevent undesired movement of a foot pedal in the system as disclosed.

I claim:

A rotary wing aircraft comprising a sustaining rotor, an airscrew disposed for counteracting the rotor torque, a first mechanism for varying the pitch of said sustaining rotor, a second mechanism for varying the pitch of said airscrew, manual control means connected to both said mechanisms for concurrently varying the pitch of said rotor and airscrew, a pair of pilot-operated members, and means operatively connecting said members to said second mechanism and constraining said members to move in opposite directions, said connecting means including means for independently transmitting control motions to said second mechanism from said manual operating means and said members, respectively, whereby the setting of said members may be maintained in fixed condition during operation of said manual control means.

HAROLD F. PITCAIRN.

REFERENCES CITED

The following references are of record in the file of this patent:

UNITED STATES PATENTS

| Number | Name | Date |
| --- | --- | --- |
| 2,317,340 | Bennett | Apr. 27, 1943 |
| 2,318,259 | Sikorsky | May 4, 1943 |
| 2,318,260 | Sikorsky | May 4, 1943 |